United States Patent [19]

Mackay

[11] Patent Number: 5,518,275
[45] Date of Patent: May 21, 1996

[54] DEVICE FOR COUPLING AND FLARING A METAL PIPE

[75] Inventor: Gary Mackay, Ancaster, Canada

[73] Assignee: Tube-Mac Industries Ltd., Ontario, Canada

[21] Appl. No.: 285,914

[22] Filed: Aug. 4, 1994

[51] Int. Cl.[6] ................................................. F16L 35/00
[52] U.S. Cl. ........................ 285/93; 285/322; 285/368; 285/379
[58] Field of Search ........................... 285/368, 412, 285/421, 413, 363, 379, 93, 322

[56] References Cited

U.S. PATENT DOCUMENTS

| | | | |
|---|---|---|---|
| 787,791 | 4/1905 | Reynolds | 285/368 |
| 1,291,646 | 1/1919 | Hughes | 285/412 X |
| 2,165,621 | 7/1939 | Donahue et al. | 285/56 |
| 2,269,629 | 1/1942 | Kreidel | 285/122 |
| 2,507,261 | 5/1950 | Mercier | 285/368 X |
| 3,590,455 | 7/1971 | Harris | 29/157 |
| 3,606,659 | 9/1971 | Robbins | 29/157 |
| 3,668,754 | 6/1972 | Boast | 29/157 |
| 4,809,418 | 3/1989 | Burli | 29/237 |
| 4,905,492 | 3/1990 | Lobakk | 72/117 |

FOREIGN PATENT DOCUMENTS

| | | | |
|---|---|---|---|
| 84543 | 6/1921 | Austria | 285/413 |
| 630833 | 11/1961 | Canada | 285/412 |
| 685502 | 7/1930 | France | 285/368 |
| 1312497 | 11/1962 | France | 285/368 |

OTHER PUBLICATIONS

Lenz "O-Ring Seal" Tube Fittings, Catalog No. 127R-A, The Lenz Company, Apr. 1992.

*Primary Examiner*—Dave W. Arola
*Attorney, Agent, or Firm*—Buchanan Ingersoll; Lynn J. Alstadt

[57] ABSTRACT

A pipe coupling device for holding a metal pipe having a selected diameter within a range of a nominal diameter plus or minus a specified tolerance is also useful for easily determining if any pipe is within specifications. A split metal ring having a diameter equal to the nominal diameter for the metal pipe and a transverse split having a width equal to the specified tolerance is placed around the pipe. A flange having a tapered cylindrical bore having diameter such that the diameter plus twice the thickness of the split metal ring equals the nominal diameter of the metal pipe plus the specified tolerance is fitted over the split metal ring. If the pipe is undersized it will slip through the split metal ring. If the pipe is oversized the flange will not fit completely over the metal ring surrounding the pipe.

11 Claims, 5 Drawing Sheets

DEVICE FOR COUPLING AND FLARING A METAL PIPE

FIELD OF THE INVENTION

The invention relates to a coupling device useful for holding a metal pipe while the end of the pipe is being flared and thereafter coupling the flared pipe to another pipe or other device.

BACKGROUND OF THE INVENTION

Pipes and tubing are used to carry a variety of fluids, some are liquids and others are gases. These fluids may be under substantial pressures or at standard pressure. Therefore, pipes and tubing are rated according to the fluid pressures which the conduit can carry without rupturing. A particular conduit is considered to be a pipe or tubing depending upon the wall thickness of the conduit, the industry or application in which it is being used, and sometimes upon whether it is plastic or metal. For present purposes and simplicity I will used the term pipe to encompass both pipe and tubing as those terms are used by those skilled in the art.

In hydraulic connections it is quite common to utilize pipes in which the end of the pipe has been flared to form a collar which is placed to abut against a surface of the device to which the pipe is being connected. In order to create the flared end or collar it is customary to provide a clamping die which is pressed against the pipe to be flared at a specified distance away from the end of the pipe. This die typically will have a gripping surface containing teeth or threads which bite into the exterior surface of the pipe being held. The die is pressed against the end of the pipe to hold the pipe during flaring. The flaring process is performed by a flaring machine having an eccentric cone. That cone is pressed against the end of the pipe and rotated circumferentially about the end of the pipe to form a flare. The flare can be at any angle relative to the side of the pipe. For many applications a flat end seal is desired in which case the flare will be at a right angle relative to the exterior surface of the pipe. This pipe flaring practice is quite old, but there have been improvements in the flaring tools. An improved flaring tool and method of using the same for forming a transverse collar on the end of the metal pipe is disclosed in U.S. Pat. No. 4,905,492.

The dies used for clamping the metal ends of the pipe to be flared are quite expensive. Additionally, the clamping action against the pipe being held causes wear, particularly on the gripping surfaces of the dies. When those surfaces have become sufficiently worn the pipe being grasped will slip. Then the surface must be refinished or the die must be scrapped. A second problem with this practice is that a separate set of dies must be made for each diameter of pipe. Consequently, there is a need for a device which can be used in the flaring of pipe ends that will improve die life and enable one to use a single clamping die for holding pipes of more than one diameter.

The art has used rings in couplings for flared and straight pipe. Some of these rings have teeth on the inside surface which will bite into the pipe as a nut or collar is drawn over the ring. Often, the exterior surface of the ring and the mating interior surface of the nut or collar are sloped so that the ring will be pressed against the pipe as the nut or collar are advanced. Examples of this type of coupling can be found in U.S. Pat. Nos. 2,165,621 to Donahue et al., 2,269,629 to Kreidel, and 4,809,418 to Burli. Today, this type of ring is most commonly used for plastic pipe. Whenever such rings have been used on flared pipe the ring has not been used in any way for or during the flaring process. Furthermore, most of the couplings which utilize such rings for plastic pipe contain rings which are not suitable for metal pipe.

SUMMARY OF THE INVENTION

I provide a split metal ring having a hardness greater than the metal pipe which I place about the end of the pipe to be flared. The interior surface of the metal pipe contains projections such as annular ribs or threads and there is a transverse split in the ring. The ring preferably is of a diameter equal to the nominal diameter specified for the metal pipe to be flared. The split has a width equal to the tolerance specified for the metal pipe. Consequently, undersized pipe is easily identified because that pipe will slip through the ring. The split ring preferably has a collar at one end and has a tapered exterior surface.

I also provide dies which can be used to clamp against the metal ring. The dies are shaped to have a specific diameter opening for the clamping action. I prefer to select a diameter so that the same dies can be used for more than one diameter of pipe. This can be accomplished by providing rings having the same outer diameter but of various thickness to provide different inside diameters.

The split ring remains on the pipe after it has been flared. Then, a forged flange is fitted over the split ring to permit the pipe to be connected to another pipe or device. That flange preferably has a central bore sized to not completely receive the split ring if the pipe is oversized beyond a set tolerance.

Other objects and advantages of the invention will become apparent from a description of certain preferred embodiments shown in the drawings.

DESCRIPTION OF THE PREFERRED EMBODIMENTS

Figure 1:
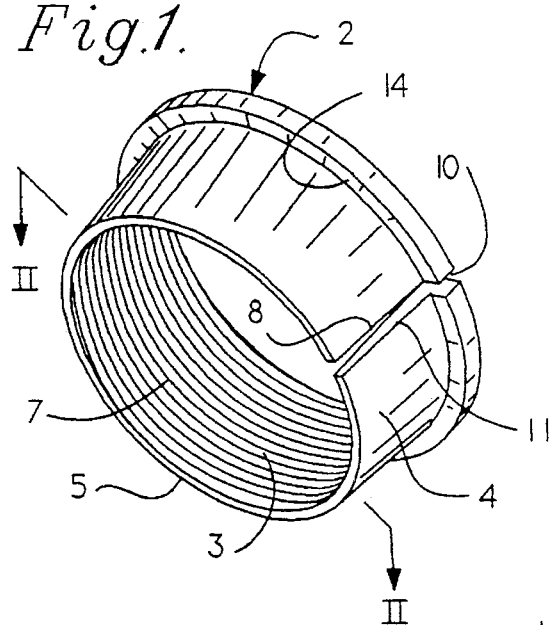
FIG. 1 is a perspective view of the split metal ring of the present invention.
Figure 2:
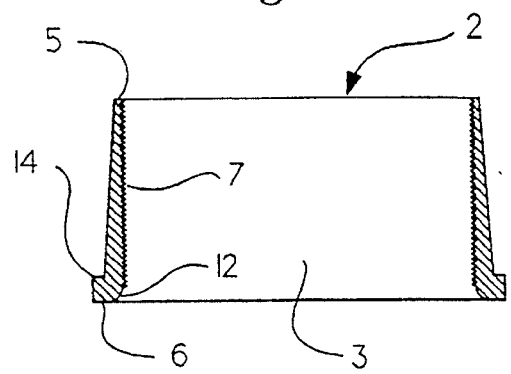
FIG. 2 is a cross-sectional view taken along the line II—II of FIG. 1.

As shown in FIGS. 1 and 2 I provide a split metal ring 2 having an inside surface 3, an outside surface 4, a back end 5 and front end 6. A transverse split 8 is provided in the ring. Split metal ring 2 is preferably made from spring steel and has a hardness greater than the hardness of the pipe around which it will be placed. As can be seen in FIG. 2 the outside surface 4 of the ring is tapered such that the ring is thicker at the front end 6 than at the back end 5. I prefer to provide a collar 14 around the front end 5 of the ring. A radius 12 is provided on the front inside edge about which the pipe is flared. As can be seen for example in FIGS. 3 and 4, the split metal ring is placed around an end of a pipe 20 to be flared. That pipe will have a nominal outside diameter, as for example 2", and a wall thickness. Most users of metal pipe will specify pipe according to a nominal outside diameter, such as 2", with a specified tolerance, such as 0.005". Consequently, any pipe which is within the range of 1.995" and 2.005" would be acceptable to the buyer. Because I make the distance between opposite sides 10 and 11 of split 8 equal to the specified tolerance the split ring will serve as a gauge to identify undersized pipe. If the ring is compressed to close the split and the pipe being held slips through the ring that pipe is undersized.

Figure 3:
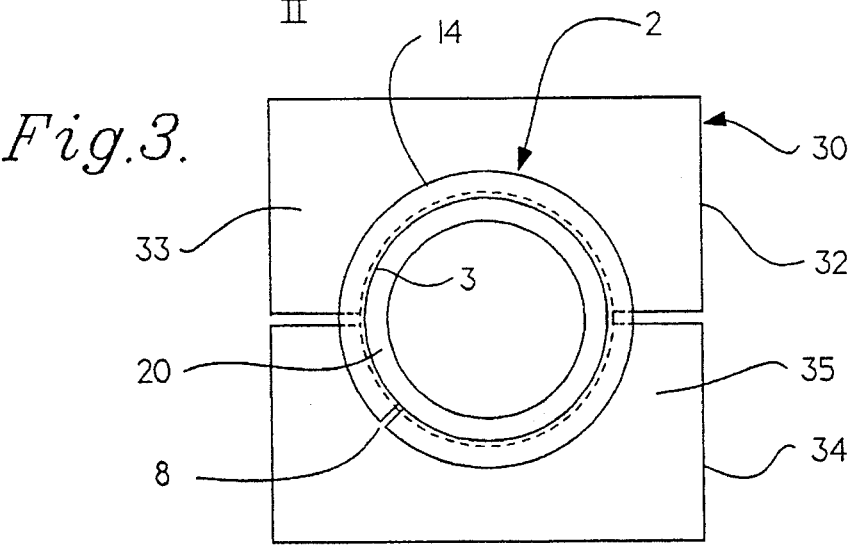
FIG. 3 is an end view showing the front end of the split metal ring positioned over a metal pipe and held within a clamping die.
Figure 4:
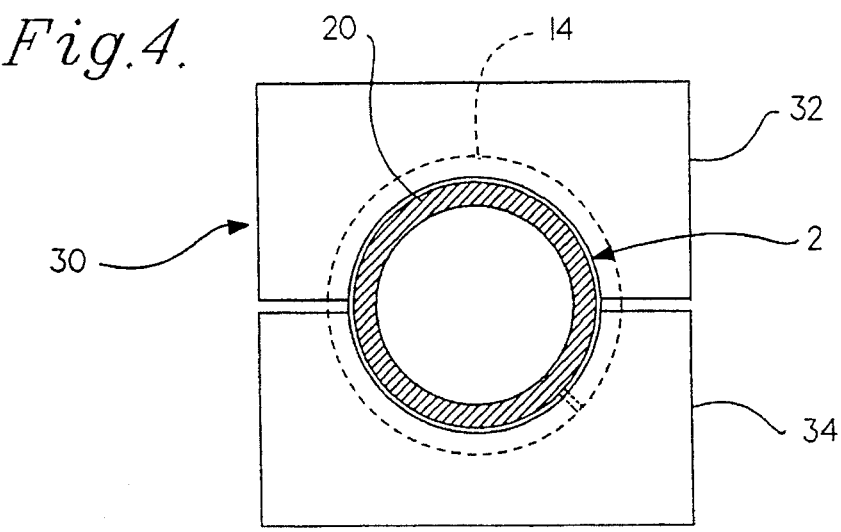
FIG. 4 is an end view showing the back end of the split metal ring positioned over a metal pipe and held within a clamping die.

The just described method for identifying undersized pipe will typically be used when the pipe is being flared. During that process a die 30 will close around the ring 2 and press the ring against the pipe 20 as shown in FIGS. 3 and 4. If the pipe has an outside diameter below the specified tolerances, split metal ring 2 will not securely clamp the pipe 20 after the clamping die has compressed the split ring 2 to close split 8. If after clamping, the pipe slips through the split ring the pipe is undersize and should not be used. For the pipe fitter working in the shop this is a very simple technique for determining whether a pipe meets the minimum specification. It involves no use of measuring tools and permits easy identification of undersized pipe by any worker.

Split ring 2 also serves a second purpose. The ring is used to grip the pipe during flaring of the end of the pipe and when the pipe is coupled to another pipe or device. In a conventional prior art flaring process a clamping die, typically comprised of two halves, clamps the end of the pipe being flared such that there is direct contact between the die and the pipe being flared. Then a flaring tool bends the end of the pipe back against the clamping die to form the flare. When completed that flare could be perpendicular to the side wall of the pipe or at any desired angle relative to the side wall of a pipe. If the flare is made perpendicular to the side wall, then the clamping die also serves as the back, or anvil, against which the end of the pipe is pressed.

Figure 15:
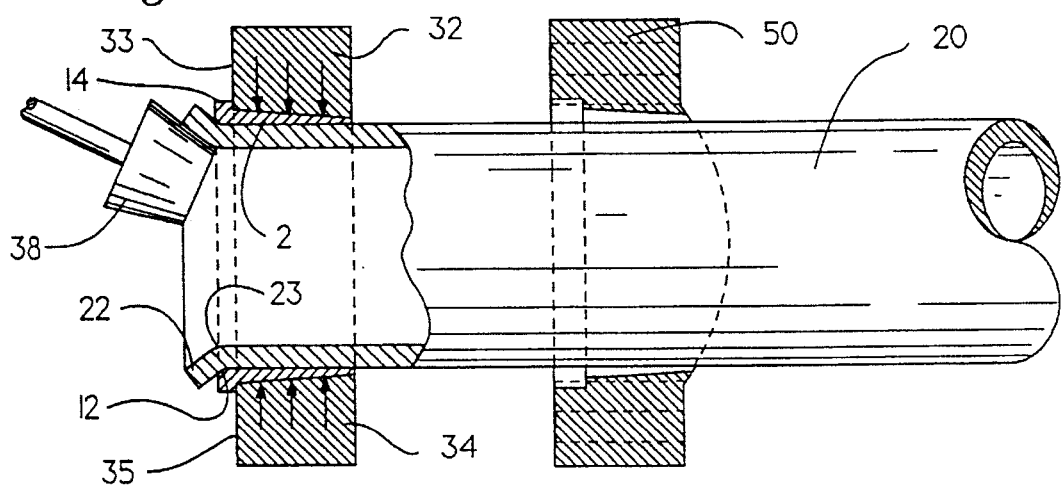
Figure 16:
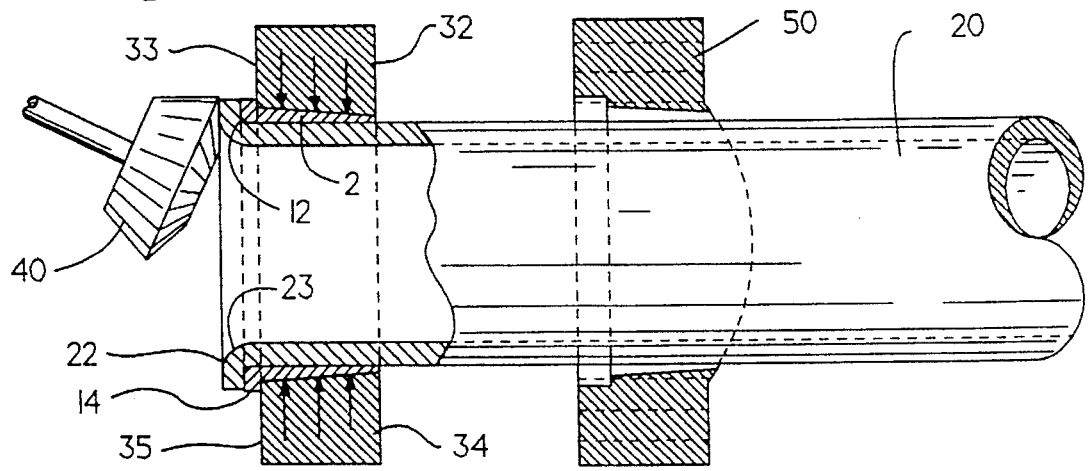

According to the present invention, ring 2 is placed on the end of the pipe so that the ring 2 will be between the clamping die 30 and the pipe 20 as shown in FIGS. 3 and 4. Clamping die 30 comprises a top half 32 and bottom half 34. The two arched shaped halves 32 and 34 of the die are brought together to encircle ring 2. As the die closes, it forces split ring 2 against the outside surface of the pipe. This causes the projections 7, which may be threads or annular ribs, to be pressed into the outside surface of the pipe 20, assuming that the pipe is not undersized. Because these projections are harder than the hardness of the pipe they will tend to score the pipe and become embedded in the outside surface of the pipe. After the split ring has been clamped about the pipe flaring tools 38 and 40 are applied to the end of the pipe as shown in FIGS. 15 and 16. The threads 7 will bite into the pipe resisting the forces of the flaring tools 38' and 40. Consequently, there will be no relative movement between the pipe 20 and split ring 2 during flaring. As can be seen in FIGS. 15 and 16, collar 14 of the split metal ring extends over the faces 33 and 35 of die halves 32 and 34 preventing relative movement between the split ring 2 and die 30 during flaring. Since it is not necessary to provide any teeth, threads or ribs on the flaring die 30 to grip split ring 2, there will be less wear of the die resulting in much longer die life.

Figure 14:
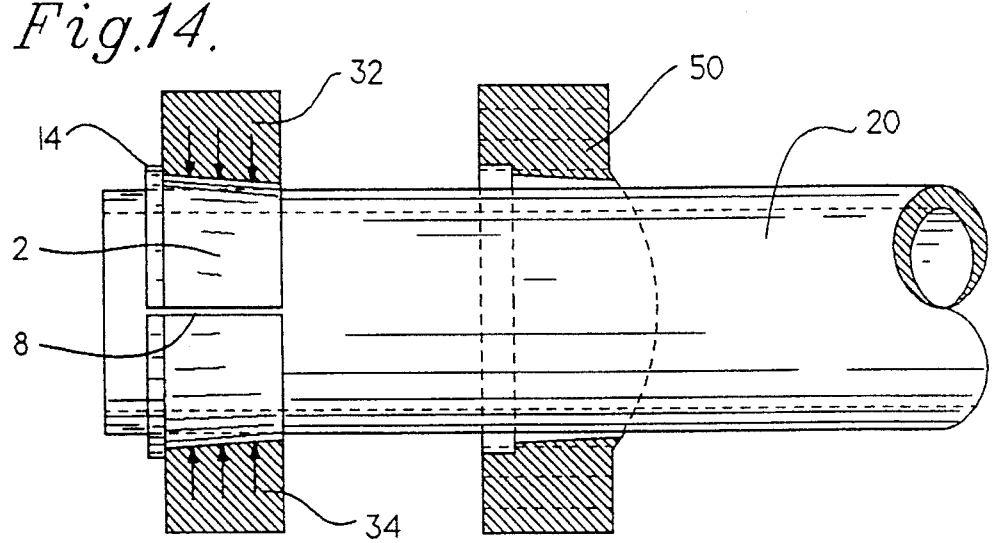

As can be seen in FIGS. 14 thru 16, the flared end 22 preferably will be perpendicular to the side of the pipe 20 to permit the pipe 20 to be face sealed against a similarly flared pipe, pump housing or other device. I prefer that the front face 24 of collar 14 have a width equal or greater than the width 26 of the portion of the flange 22 which will press against the ring.

Figure 5:
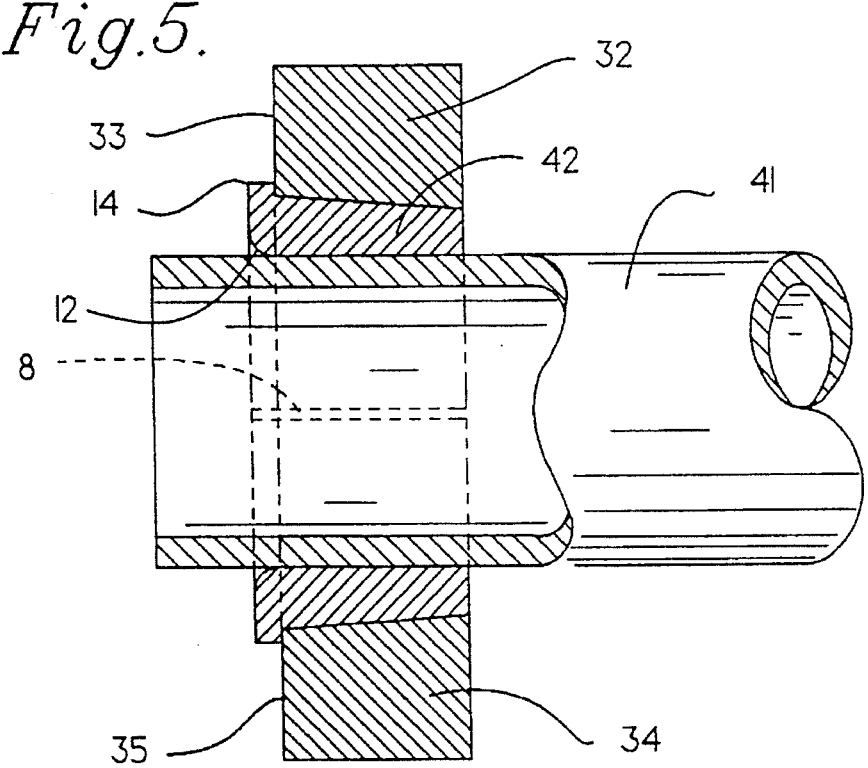
FIG. 5 is an end view similar to FIG. 4 showing the back end of a second split metal ring positioned over a smaller metal pipe and held within the same clamping die.
Figure 6:
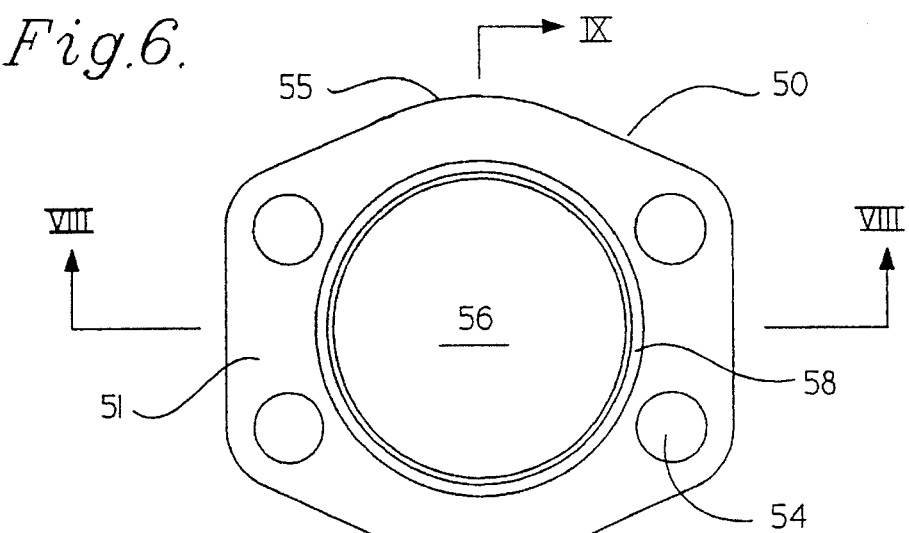
FIG. 6 is a perspective view of the coupling flange.
Figure 7:
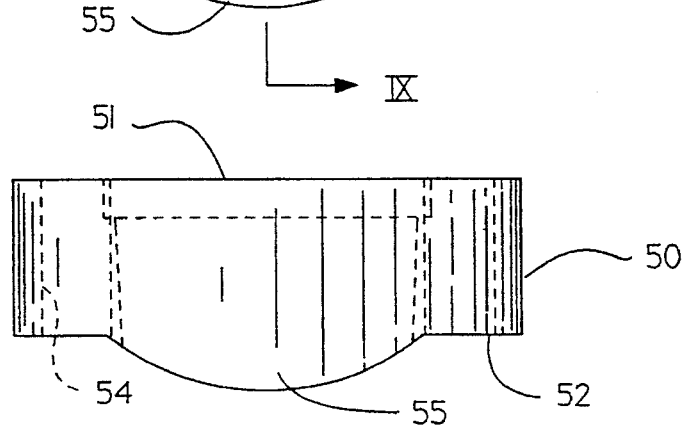
FIG. 7 is a side view of the coupling flange.

The present system permits one to flange a pipe 41 of smaller diameter than the pipe 20 shown in FIGS. 3 and 4 using the same die 30. As shown in FIG. 5 this is possible because I provide a thicker split metal ring 42. The difference in thickness between split metal ring 42 used for smaller pipe 41 and split metal ring 2 used for pipe 20 is the difference in outside diameters of the two pipes. Because the same clamping die can be used for different diameter pipes a fewer number of dies are required to be maintained in inventory. Consequently, the present invention provides a significant savings over prior art flaring devices and techniques.

Figure 8:
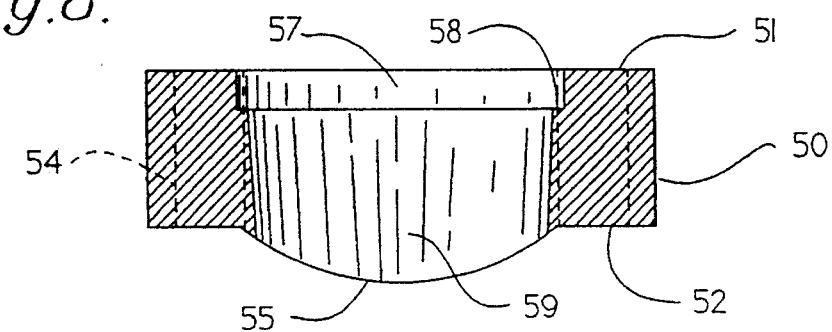
FIG. 8 is a sectional view taken along lines VIII—VIII of FIG. 6.
Figure 9:
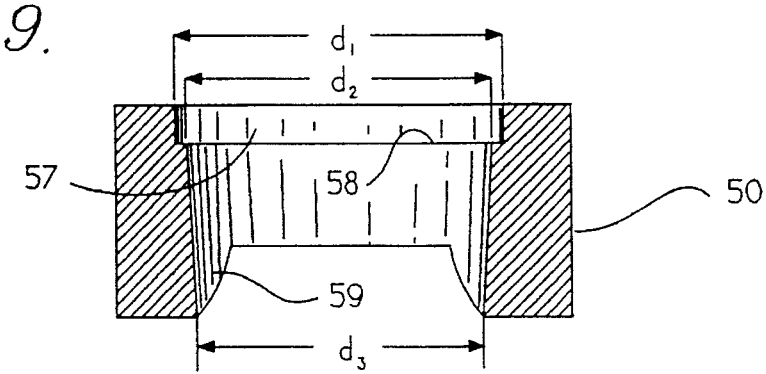
FIG. 9 is a sectional view taken along lines IX—IX of FIG. 6.
Figure 11:
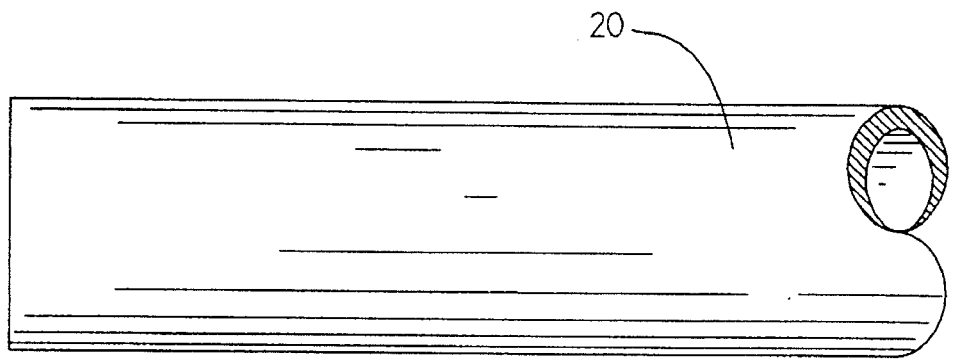
FIGS. 11 thru 16 are a sequence of side views partially in section showing the sequence for flaring a pipe in accordance with the present invention.

After the pipe has been flared it is ready to be connected to another pipe or device. To make the connection I provide a coupling flange shown in FIGS. 6, 7, 8 and 9. The coupling flange 50 has a front surface 51 and back surface 52. Bolt holes 54 are provided for connecting the coupling flange 50 to a second pipe 61 and coupling flange 61 or other device (not shown) using bolts 66 shown in FIG. 10. I prefer that coupling flanges 50 and 61 be metal forgings. I also prefer to make portions 55 of the coupling flange 50 thicker for added strength. Coupling flange 50 has a central bore 56 sized to receive the split ring 2. As can be seen more clearly in FIGS. 8 and 9, bore 56 is shaped to have a top portion 57 generally circular in diameter which extends from the top surface 51 to a shoulder 58. The shoulder is sized to receive the collar 14 of split ring 2. At shoulder 58 the bore will have a diameter $d_2$ which will be less than the diameter $d_1$ of the bore at the top surface 51. Inside surface 59 of the lower portion of the bore is tapered from shoulder 58 to bottom 52. Consequently, the diameter $d_3$ at the bottom of the coupling flange will be less than diameter $d_2$ at shoulder 58. Diameters $d_1$, $d_2$ and dB are chosen to be equal to the nominal value of the outside diameter of the pipe to be held plus the specified tolerance and twice the thickness of the split ring 2 which is fitted within the coupling. Consequently, if an oversized pipe is placed within the ring the coupling flange cannot be drawn completely over the ring. For this reason the split metal ring 2 together with the coupling flange 50 serve as a gauge to identify pipe which has an outside diameter greater than the specified nominal value plus the tolerance.

Figure 10:
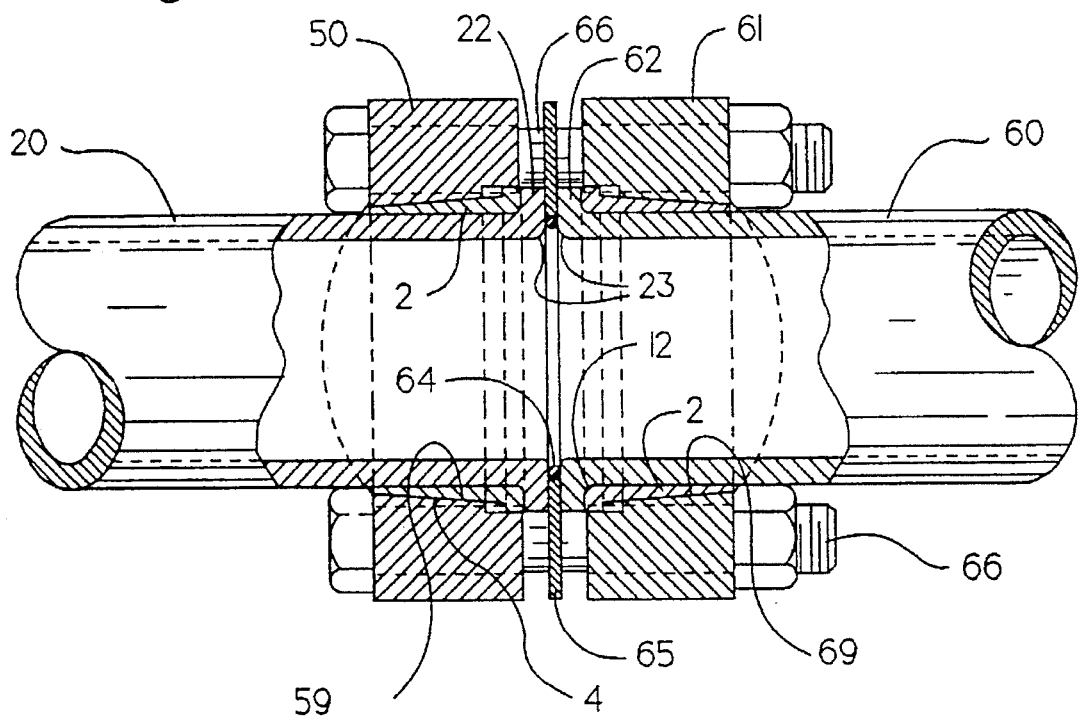
FIG. 10 is side view partially in section showing pipes which have been flared and coupled together in accordance with the present invention.

As can be seen from FIG. 10, coupling flange 50 is placed over the split ring 2 which is on pipe 20. Typically a seal plate 65 and gasket or O-ring 64 will be placed against the flared ends 22 and 62 of the pipes 20 and 60. Bolts 66 will extend through the coupling flanges 50 and 61 and optionally through the seal plate 65. The bolts are then tightened to couple and seal pipes 20 and 60 together. As the bolts 66 are tightened the inside surfaces 59 and 69 of coupling flanges 50 and 61 will be drawn across the outside surfaces 4 of the split rings 2. Since these surfaces are tapered this action will cause the threads or ribs on the inside surface 3 of the split rings 2 to maintain or increase their bites into pipes 20 and 60 as the pipes are drawn together. Consequently, a portion of the clamping forces will be acting through the biting threads thereby reducing the stress on the back of the flare.

I have found that the coupling shown in FIG. 10 can be used for pipes and connections carrying fluids under pressure. For example, a 2" section of ASTM-50 tubing was statically tested to determine if the coupling would leak at the rated pressure of the flange which was 3000 psi. A coupling was created as shown in FIG. 10. Oil was then pumped into the pipe to a pressure of 3000 psi and held at that pressure for one hour. No leaks of the coupling occurred. Based upon this result it is my expectation that the present coupling can be used at higher pressures of up to 5000 psi without leaking.

Figure 12:
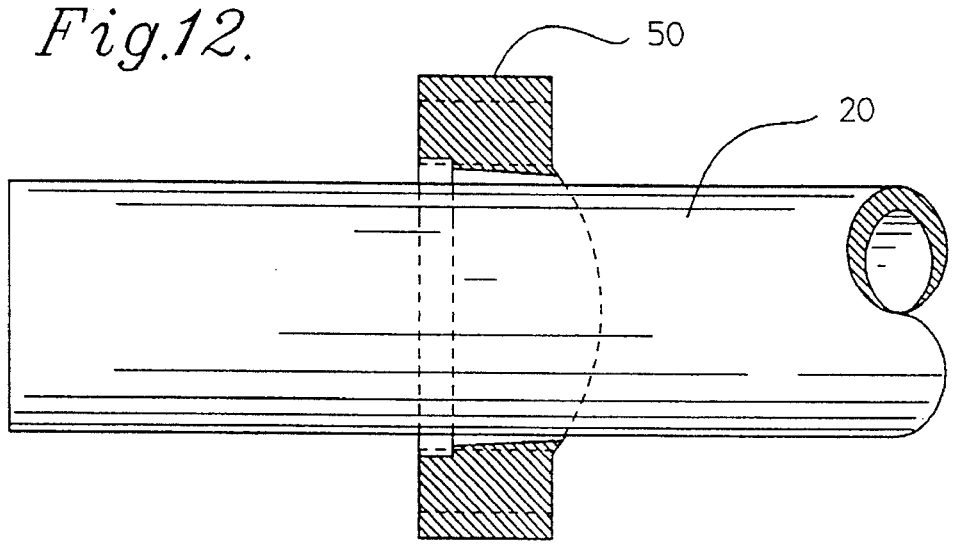
Figure 13:
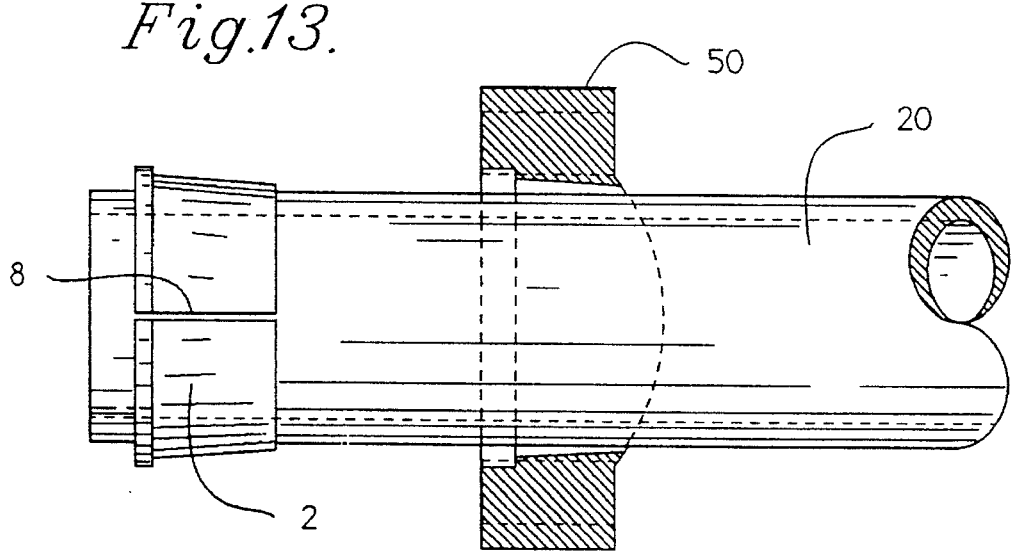

The procedure for flaring the end of a pipe in accordance with the present invention is illustrated in FIGS. 11 thru 16. One begins with a selected pipe or tubing 20 shown in FIG. 11 and preferably then slips flange 50 over the pipe as shown in FIG. 12. Optionally, one could slip the flange 50 over the pipe from the opposite end (not shown) after flaring, but this may be inconvenient if the pipe is quite long. Next the split metal ring is fitted over the pipe as shown in FIG. 13. This assembly is placed in a flaring machine where a clamp 30 comprised of top 32 and bottom 34 will close pressing the split ring against pipe 20. Projections from the split ring will bite into the pipe holding it in place. An eccentric cone or other tools 38 and 40 are used to flare the end of the pipe 20 around radius edge 12 as shown in FIGS. 15 and 16. Then, the flaring tool and clamping die are removed. Now flange 50 can be moved over split ring 2 and the assembly is ready for connection to another pipe or device such as is shown in FIG. 10.

Although I have shown and described certain present preferred embodiments of my invention, it should be distinctly understood that the invention is not limited thereto, but may be variously embodied within the scope of the following claims.

I claim:

1. A pipe coupling and gauging device for holding a metal pipe having a selected diameter within a range of a nominal diameter minus a specified tolerance and the nominal diameter plus the specified tolerance and for identifying undersized pipe and oversized pipe comprising:

a. a split metal ring having a hardness greater than a hardness of the metal pipe, a diameter equal to the nominal diameter of the metal pipe, a transverse split having a width equal to the specified tolerance, an inside surface having projections extending therefrom and a tapered outside surface such that there is a major thickness at a first end of the coupling greater than a minor thickness at a second, opposite end thereof; and b. a flange having a tapered cylindrical bore having a major diameter at one end and a minor diameter at an opposite end such that the minor diameter plus twice the minor thickness of the split metal ring equals the nominal diameter of the metal pipe plus the specified tolerance and the major diameter plus twice the thickness of the major thickness of the split metal ring equals the nominal diameter plus the specified tolerance whereby undersized pipe will slip through the split metal ring when the split metal ring is sufficiently within the flange to completely close the transverse slot, and the split metal ring will not fit fully within the flange when an oversized pipe is within the split metal ring.

2. The pipe coupling device of claim 1 also comprising a collar attached to the first end of the ring, the collar having a selected width, and wherein the flange has an annular recess sized and positioned to receive the collar.

3. The pipe coupling device of claim 1 wherein the projections have a height of between 1 and 2 thousandths of an inch.

4. The pipe coupling device of claim 1 wherein the projections are one of annular ribs, threads, and teeth.

5. A pipe coupling and gauging device for holding a metal pipe having a selected diameter within a range of a nominal diameter minus a specified tolerance and the nominal diameter plus the specified tolerance and for identifying oversized pipe comprising:

a. a split metal ring having a hardness greater than a hardness of the metal pipe and a diameter sufficient to permit the metal pipe having a diameter equal to the nominal diameter to pass there through, an inside surface having projections extending therefrom and a tapered outside surface such that there is a major thickness at a first end of the coupling greater than a minor thickness at a second, opposite end thereof; and b. a flange having a tapered cylindrical bore having a major diameter at one end and a minor diameter at an opposite end such that the minor diameter plus twice the minor thickness of the split metal ring equals the nominal diameter of the metal pipe plus the specified tolerance and the major diameter plus twice the thickness of the major thickness of the split metal ring equals the nominal diameter plus the specified tolerance whereby the metal ring will not fit fully within the flange when an oversized pipe is within the metal ring.

6. A pipe coupling and gauging ring for holding a metal pipe having a selected diameter within a range of a nominal diameter minus a specified tolerance and the nominal diameter plus the specified tolerance and for identifying undersized pipe comprising a split metal ring having a hardness greater than a hardness of the metal pipe, a diameter equal to the nominal diameter of the metal pipe, a transverse split having a width equal to the specified tolerance, an inside surface having projections extending therefrom and a tapered outside surface such that there is a major thickness at a first end of the coupling greater than a minor thickness at a second, opposite end thereof whereby undersized pipe will slip through the split metal ring whenever a force acts on the ring to completely close the transverse split.

7. The pipe coupling ring of claim 6 also comprising a collar attached to the first end of the ring.

8. The pipe coupling device of claim 6 wherein the projections have a height of between 1 and 2 thousandths of an inch.

9. The pipe coupling device of claim 6 wherein the projections are one of annular ribs, threads, and teeth.

10. The pipe coupling and gauging ring of claim 6 also comprising a clamping die engaging the outside surface of the ring, the clamping die capable of exerting the force to close the transverse split when an undersized pipe is within the split metal ring.

11. The pipe coupling and gauging ring of claim 10 wherein the clamping die has a size and is configured to mate with the outside surface of the ring.

\* \* \* \* \*